(12) United States Patent
Nishimura

(10) Patent No.: US 10,203,649 B2
(45) Date of Patent: Feb. 12, 2019

(54) BEARING DEVICE AND TRANSFERRING DEVICE

(71) Applicant: CANON KABUSHIKI KAISHA, Tokyo (JP)

(72) Inventor: Yutaka Nishimura, Meerbusch (DE)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/689,446

(22) Filed: Aug. 29, 2017

(65) Prior Publication Data

US 2018/0059607 A1    Mar. 1, 2018

(30) Foreign Application Priority Data

Aug. 30, 2016 (JP) .................................. 2016-168552

(51) Int. Cl.
*G03G 21/00* (2006.01)
*F16C 35/00* (2006.01)
(Continued)

(52) U.S. Cl.
CPC ........... *G03G 21/1647* (2013.01); *F16C 9/00* (2013.01); *F16C 35/061* (2013.01); *G03G 21/168* (2013.01); *F16C 2324/16* (2013.01); *G03G 2221/1642* (2013.01); *G03G 2221/1651* (2013.01)

(58) Field of Classification Search
CPC ............. G03G 15/0258; G03G 21/168; G03G 21/169; G03G 21/1633; G03G 21/1647; G03G 21/1685; G03G 21/1676; G03G 2221/1618; G03G 2221/163; G03G 2221/1639; G03G 2221/1642; G03G 2221/1651; G03G 2221/1684;
(Continued)

(56) References Cited

U.S. PATENT DOCUMENTS 7,133,635 B2 * 11/2006 Chung ............... G03G 15/2064
399/328
8,849,158 B2 * 9/2014 Kamano ............... G03G 15/161
399/121
(Continued)

FOREIGN PATENT DOCUMENTS

JP    H06-11984 A    1/1994
JP    H07-84419 A    3/1995
(Continued)

*Primary Examiner* — Robert Beatty
(74) *Attorney, Agent, or Firm* — Venable LLP

(57) ABSTRACT

A bearing device includes a first bearing for a first roller; a second bearing for a second roller; a bearing holder for the first and second bearings, wherein when the first bearing is mounted in the holder, a peripheral surface of the first roller is projected out of the holder through an opening of the holder, and the second roller is provided in the second bearing contacting the first roller in the holder; a contact portion for determining a relative position between the first and second bearings by contacting the first bearing with the first bearing mounted in the holder; and a moving mechanism for moving the second bearing toward the opening with dismounting of the first bearing, and for holding the second bearing in a position in which at least a part of a peripheral surface of the second roller projects out of the holder through the opening.

13 Claims, 10 Drawing Sheets

(51) Int. Cl.
   *G03G 21/16*   (2006.01)
   *F16C 35/06*   (2006.01)
   *F16C 9/00*    (2006.01)

(58) Field of Classification Search
   CPC . G03G 2221/169; F16C 35/06; F16C 35/061;
   F16C 2324/00; F16C 2324/16
   USPC .......................................................... 399/121
   See application file for complete search history.

(56) References Cited

U.S. PATENT DOCUMENTS

| | | | |
|---|---|---|---|
| 9,335,705 B1 * | 5/2016 | Fukuzawa | G03G 15/75 |
| 2014/0079449 A1 * | 3/2014 | Arikawa | G03G 15/2025 |
| | | | 399/327 |
| 2017/0139341 A1 * | 5/2017 | Morishita | G03G 15/0258 |

FOREIGN PATENT DOCUMENTS

| | | | |
|---|---|---|---|
| JP | 2002040829 A | * | 2/2002 |
| JP | 2005-316200 A | | 11/2005 |
| JP | 2010-266570 A | | 11/2010 |
| JP | 2011150156 A | * | 8/2011 |

\* cited by examiner (a)

(b)

(a)

(b)

(a)

(b)

(a)

(b)

BEARING DEVICE AND TRANSFERRING DEVICE

FIELD OF THE INVENTION AND RELATED ART

The present invention relates to a bearing device and a transferring device, which are employed by an electrophotographic image forming apparatus, an electrostatic image forming apparatus, and the like. It relates to also an image forming apparatus which has the bearing device and transferring device.

Conventionally, an image forming apparatus which uses an electrophotographic method or the like employs a transfer roller as a transferring member, in order to transfer a toner image from its photosensitive member as an image bearing member, onto a transfer medium such as paper. Further, in the case of some color image forming apparatuses, a toner image is transferred (first transfer) from their photosensitive drum as the first image bearing member, onto its intermediary transferring member, as the second image bearing member, such as an endless belt, and then, the toner image is transferred (secondary transfer) from the intermediary transferring member, onto transfer medium. Thus, they also employ a transfer roller to transfer a toner image from the intermediary transferring medium onto the final transfer medium.

As a transfer roller, an elastic roller, the surface layer of which is formed of an elastic substance, is widely used. The elastic layer of an elastic roller is made electrically conductive by dispersing microscopic particles of ion-conductive substance in the material for the elastic layer. This type of transfer roller sometimes increases in electrical resistance by the conduction of electricity through the roller. As the transfer roller increases in electrical resistance, the transfer voltage to be applied to the transfer roller to transfer a toner image, has to be increased sometimes, making it possible that the transfer roller is reduced in its life span which is determined by the capacity of its high voltage substrate.

Thus, it has been proposed to place a power supply roller, as a power supplying member, in contact with the peripheral surface of a transfer roller, to supply the transfer roller with electric current in a manner to moderate the polarization of the ion-conductive agent in the elastic layer (Japanese Laid-open Patent Application No. 2005-316200).

In a case where an image forming apparatus is configured as described above, it is desired that the distance between the shaft of a power supply roller and that of a transfer roller is precisely maintained. As the power supply roller, a metallic roller (roller having metallic surface), which rarely needs to replaced, can be employed. Thus, from the standpoint of operational efficiency, it is preferred for an image forming apparatus to be configured so that when a transfer roller needs to be replace, it is possible to remove the transfer roller without involving the power supply roller.

In comparison, in Japanese Laid-open Patent Application No. 2010-266570, it has been proposed to configure an image forming apparatus so that the two rollers are supported by a single bearing member, and the roller which needs to be replaced can be easily removed from the bearing member without involving the other roller.

It became evident, however, that the application of the invention disclosed in Japanese Laid-open Patent Application No. 2010-266570 to the combination of the transfer roller, power supply roller, and bearing member, suffers from the following issues.

That is, a power supply roller sometimes needs to be cleaned to remove the contaminants such as toner particles on its peripheral surface. In such a case, usually, an operator cleans the power supply roller after the operator removes the transfer roller from the bearing member. However, it is sometimes required that the power supply roller is to be disposed in the opposite adjacencies of the transfer roller from the image bearing member, in order to prevent electrical current from flowing into the peripheral surface of the transfer roller. That is, in order to prevent electric current from flowing into the peripheral surface of the transfer roller, the power supply roller is disposed on the deepest point in the unit comprising the transfer roller and power supply roller, from the surface of the unit, at which the peripheral surface of the transfer roller 5 is exposed. Further, in consideration of the recording medium conveyance, the clearance between the intermediary transferring member and transfer roller, on the upstream side of the nip between the intermediary transferring member and transfer roller, and that on the downstream side, are sometimes set as narrow as possible. Thus, even after the removal of the transfer roller from the bearing member, the opening for the operator to access the power supply roller is so narrow that it is rather difficult for the operator to access the power supply roller. That is, the bearing device configuration is not desirable from the standpoint of the efficiency with which the power supply roller can be cleaned.

Thus, the primary object of the present invention is to provide a bearing device which is configured so that it supports the first and second rollers in such a manner that the first roller can be replaced without involving the second roller, and which is superior to any conventional bearing device in terms of the efficiency with which the second roller can be cleaned, and also, to provide an image forming apparatus equipped with the transferring device in accordance with the present invention.

SUMMARY OF THE INVENTION

According to an aspect of the present invention, there is provided a bearing device for bearing a first roller and a second roller, said bearing device comprising a first bearing member configured to rotatably support said first roller; a second bearing member configured to rotatably support said second roller; a bearing holder configured to dismountably support said first bearing member and dismountably support said second bearing member, wherein in a state that said first bearing member is mounted in said bearing holder, at least part of a peripheral surface of said first roller is projected out of said bearing holder through an opening provided in said bearing holder, and said second roller is provided in said second bearing member contacting said first roller in said bearing holder; a contact portion configured to determine a relative position between said first bearing member and said second bearing member by contacting said first bearing member in a state that said first bearing member is mounted in said bearing holder; and a moving mechanism configured to move said second bearing member toward said opening with dismounting of said first bearing member from said bearing holder, and configured to hold said second bearing member in a position in which at least a part of a peripheral surface of said second roller projects out of said bearing holder through said opening.

Further features of the present invention will become apparent from the following description of exemplary embodiments with reference to the attached drawings.

Figure 1:
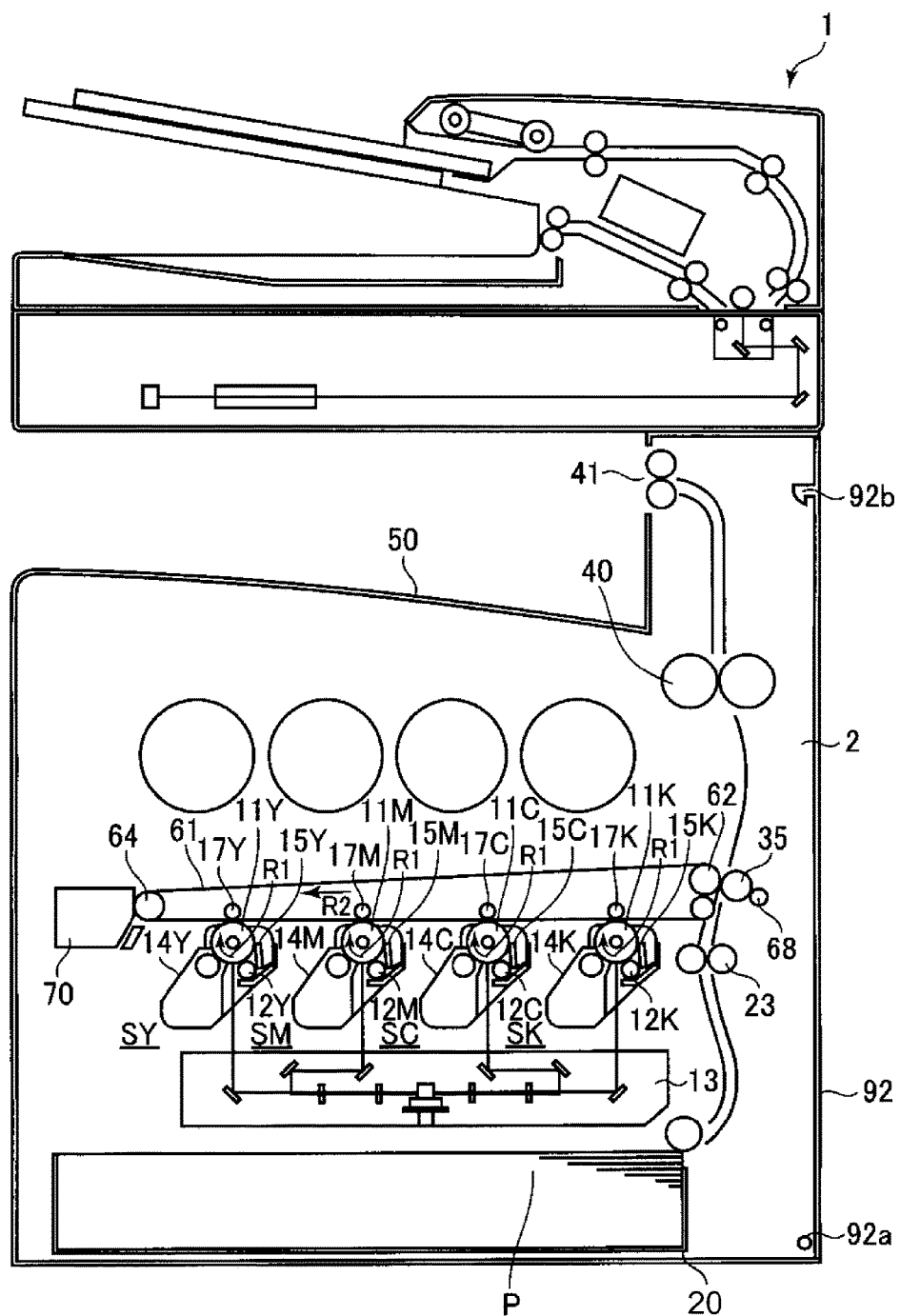
FIG. 1 is a sectional view of the image forming apparatus in the first embodiment of the present invention.
Figure 2:
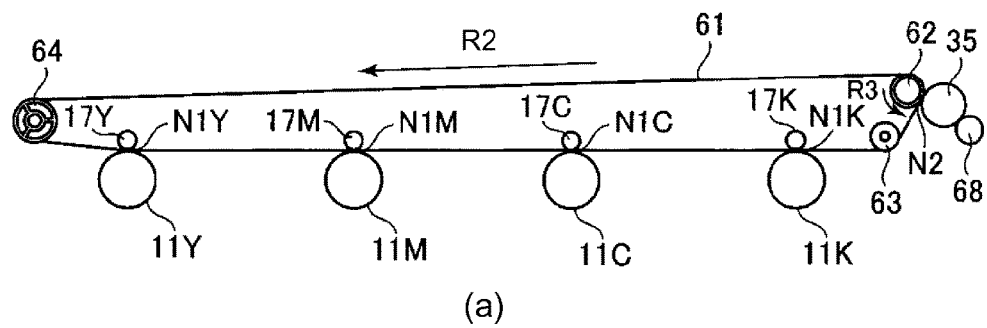
Figure 2:
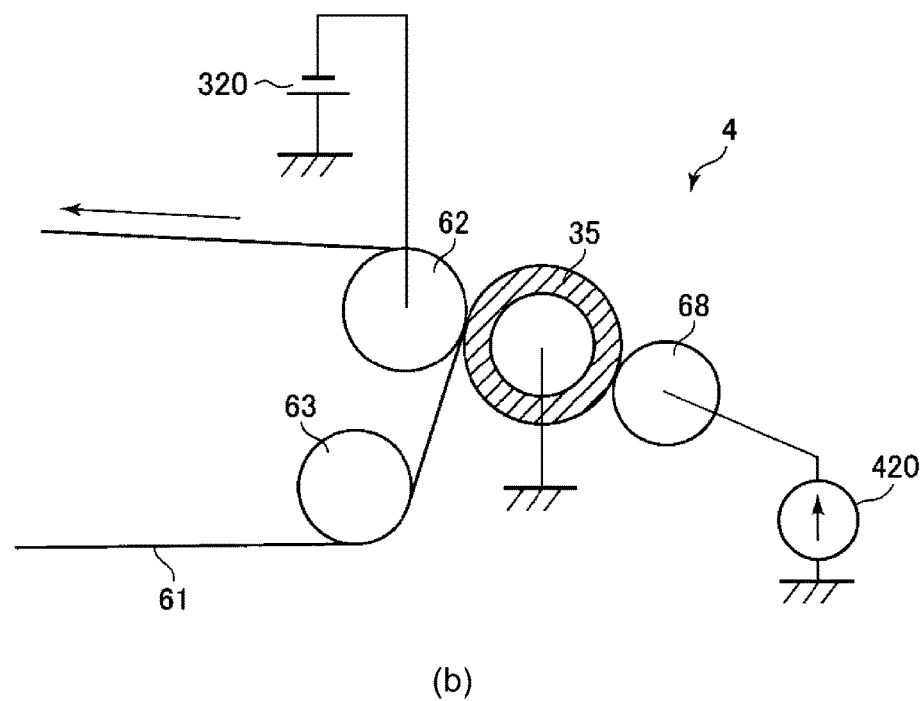

Parts (a) and (b) of FIG. 2 are combination of sectional views of the image transferring portions of the image forming apparatus shown in FIG. 1, and a schematic sectional view of the secondary transferring portion, and its adjacencies, of the image forming apparatus. It is for describing the transferring portions.

Figure 3:
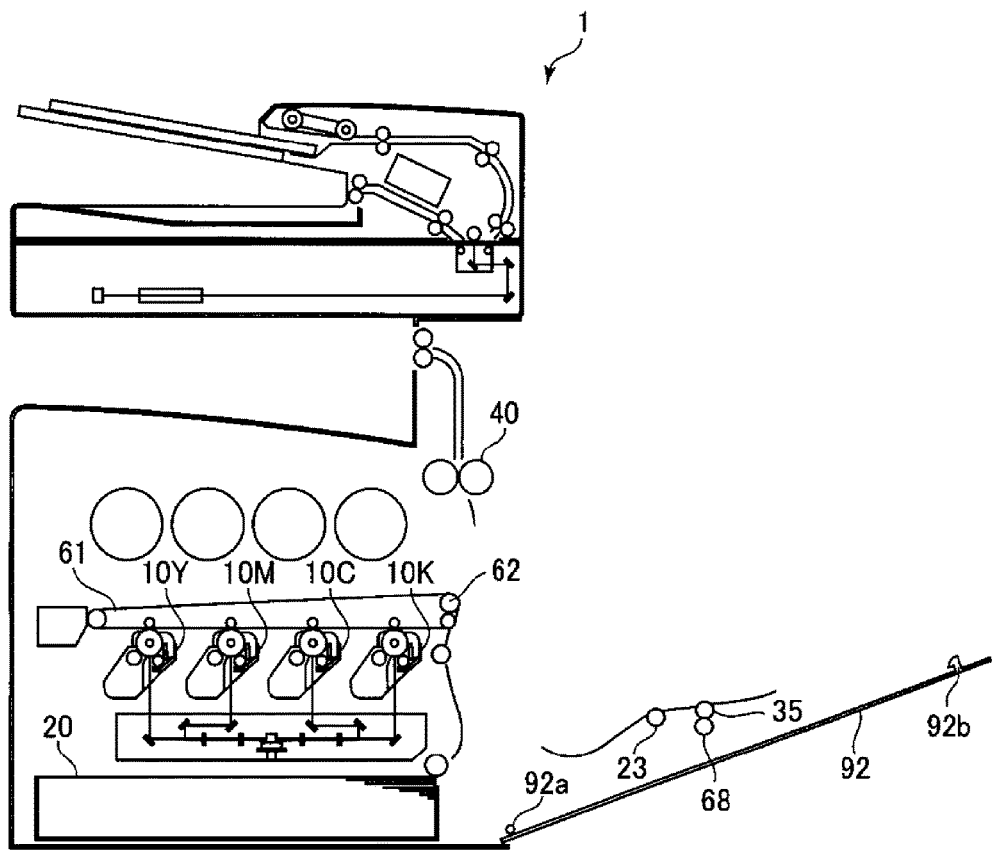

FIG. 3 is a sectional views of the image forming apparatus shown in FIG. 1, when the right door unit is fully open.

Figure 4:
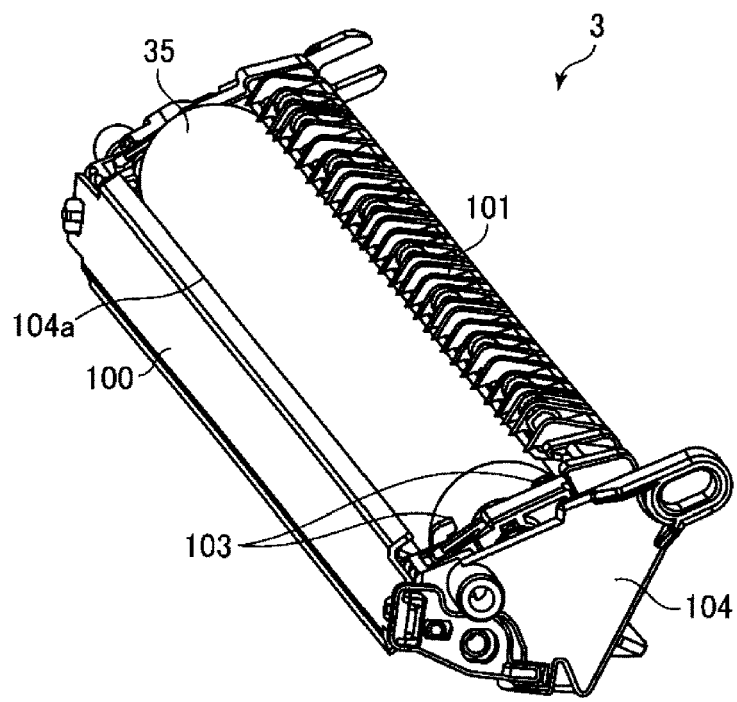
Figure 4:
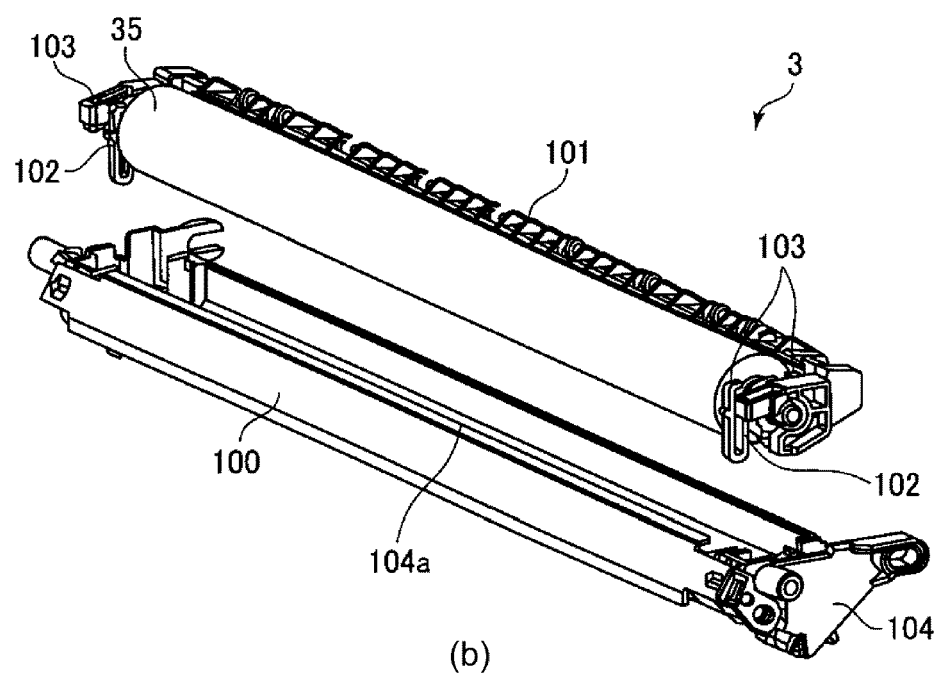

Parts (a) and (b) of FIG. 4 are perspective views of the bearing device in the first embodiment.

Figure 5:
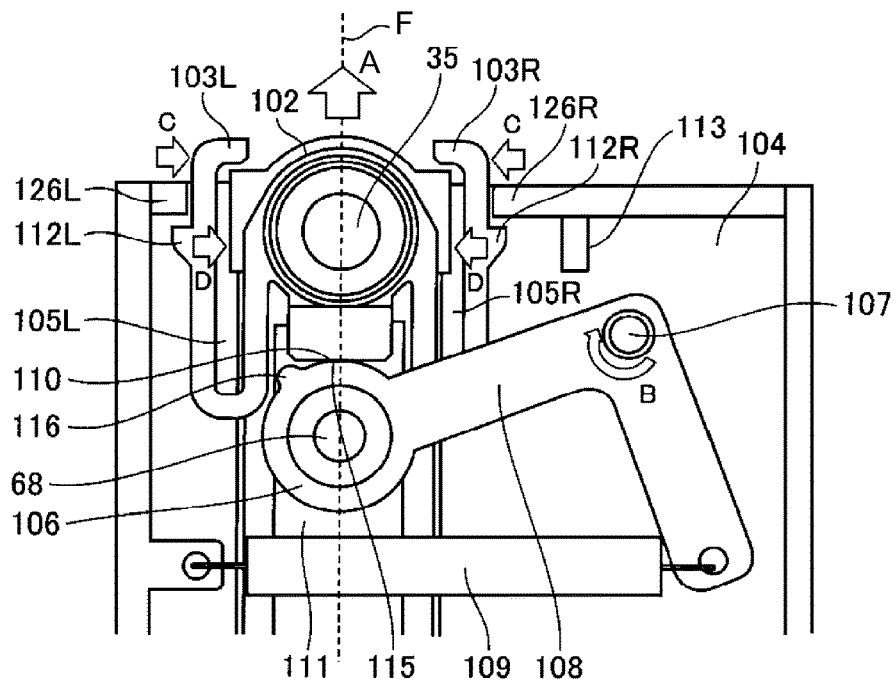
Figure 5:
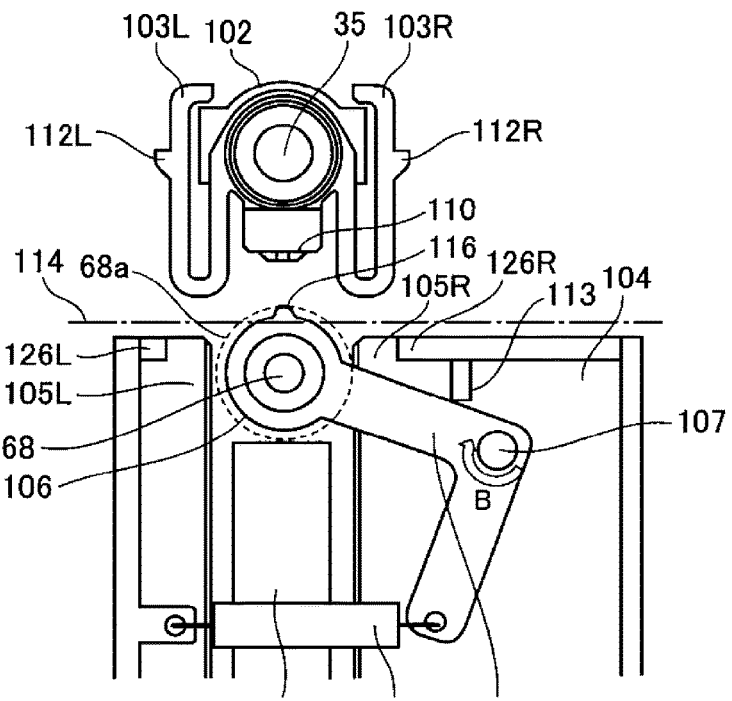

Parts (a) and (b) of FIG. 5 are sectional views of the bearing device in the first embodiment, and is for describing the configuration and operation of the apparatus.

Figure 6:
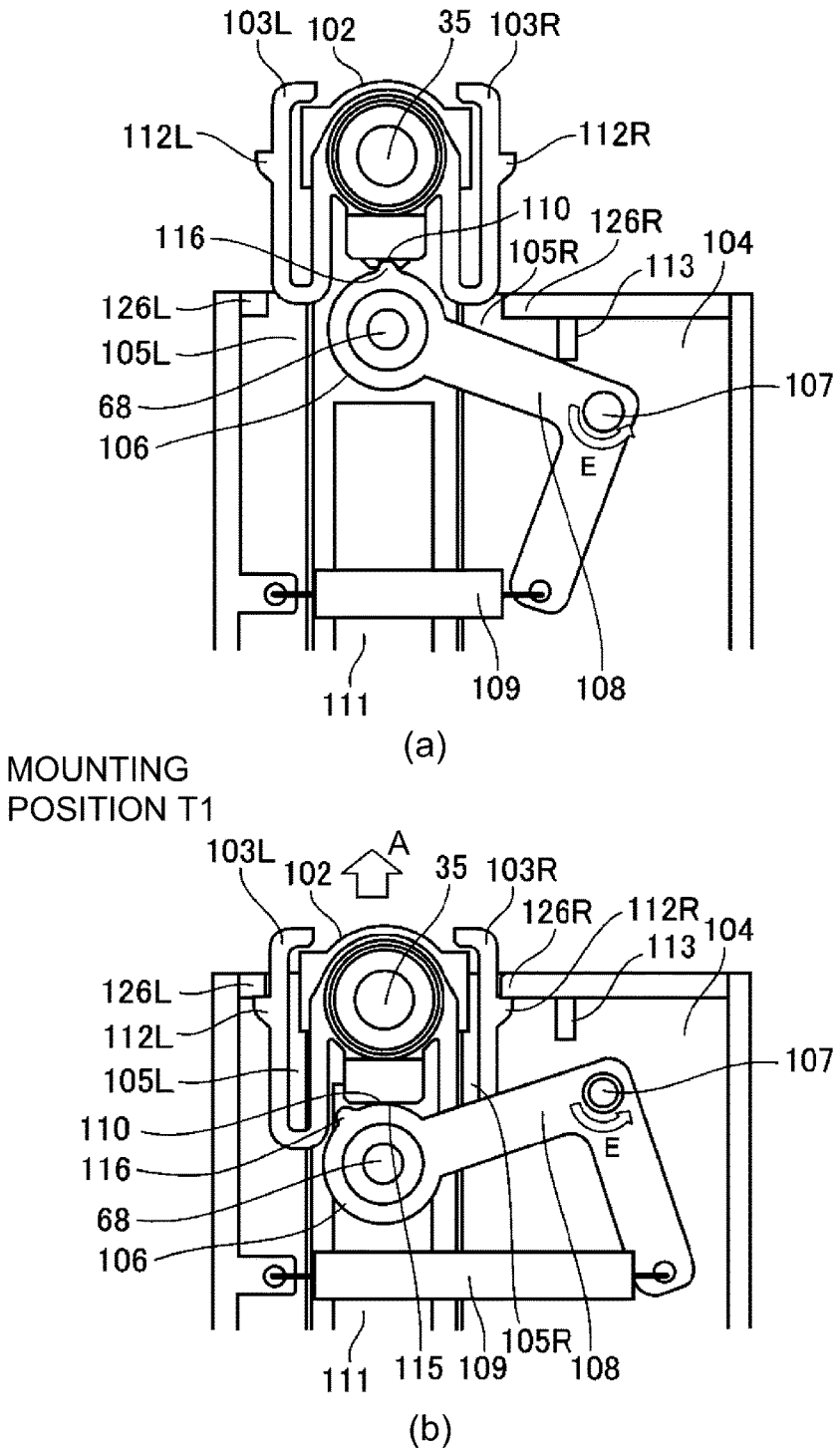

Parts (a) and (b) of FIG. 6 also are sectional views of the bearing device, which is for describing the configuration and operation of the bearing device.

Figure 7:
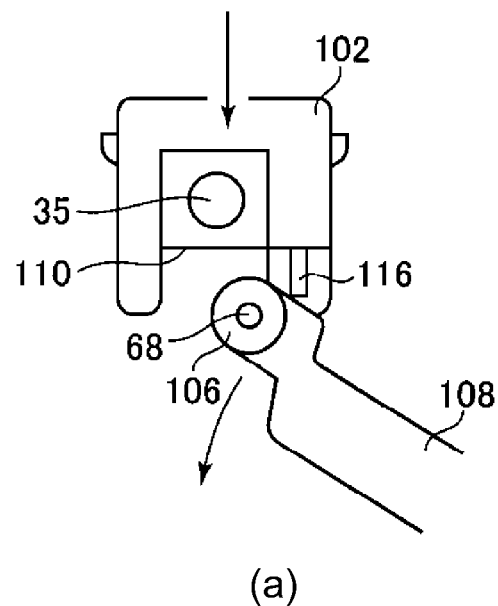
Figure 7:
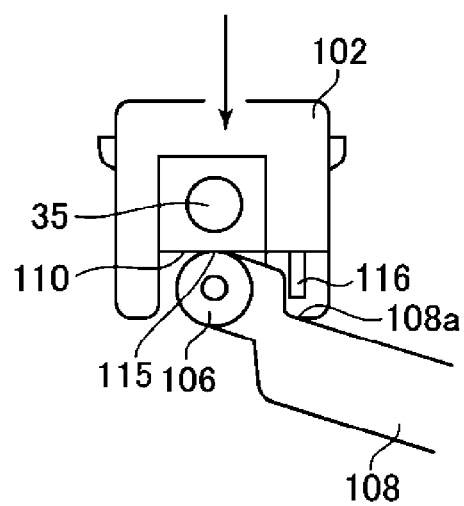

Parts (a) and (b) of FIG. 7 are sectional views of the bearing device in the other embodiment of the present invention.

Figure 8:
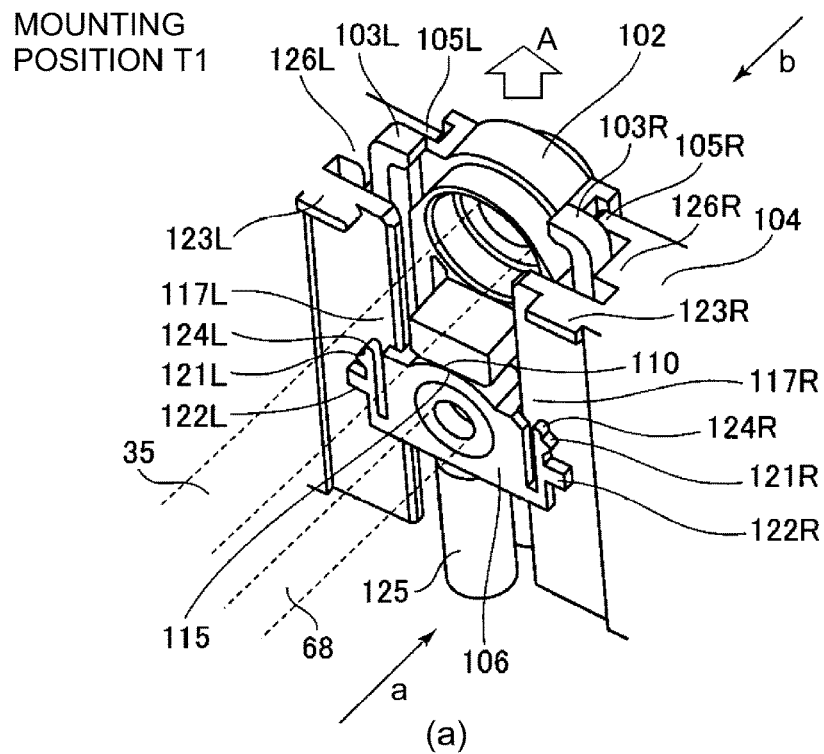
Figure 8:
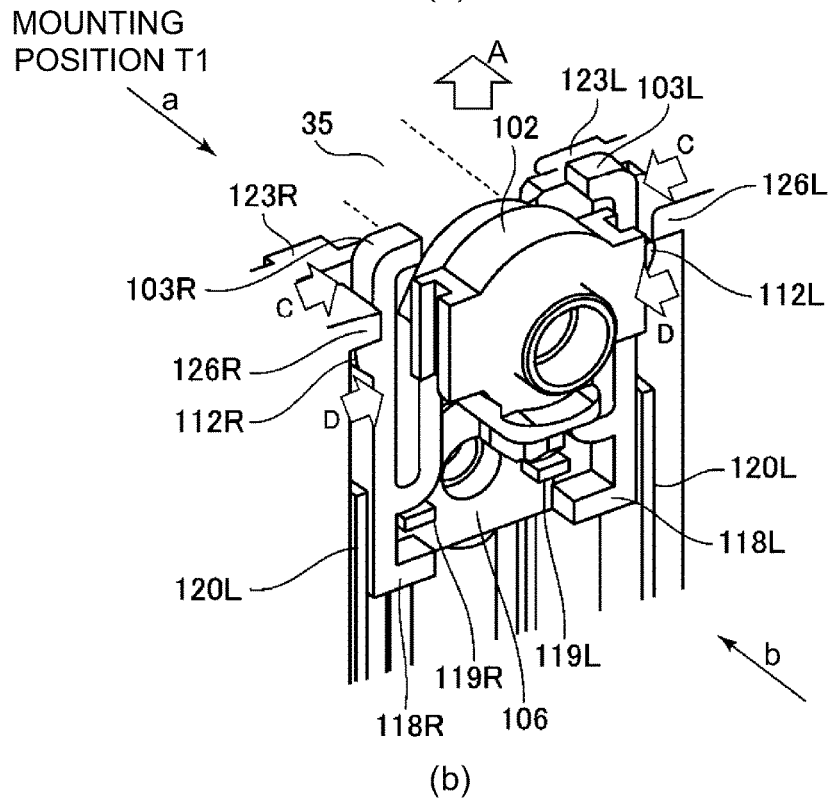

Parts (a) and (b) of FIG. 8 are perspective views of the bearing member in the other embodiment of the present invention, which is for describing the configuration and operation of the apparatus.

Figure 9:
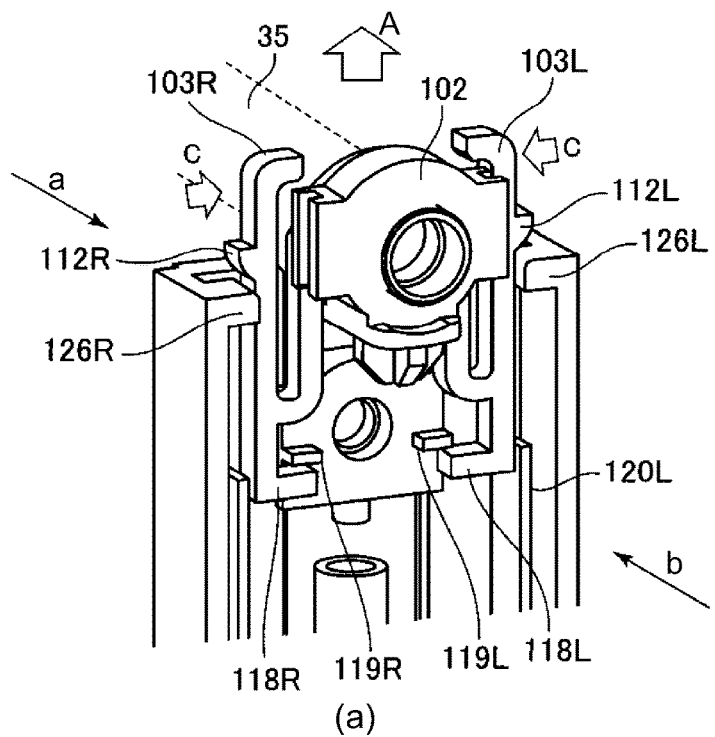
Figure 9:
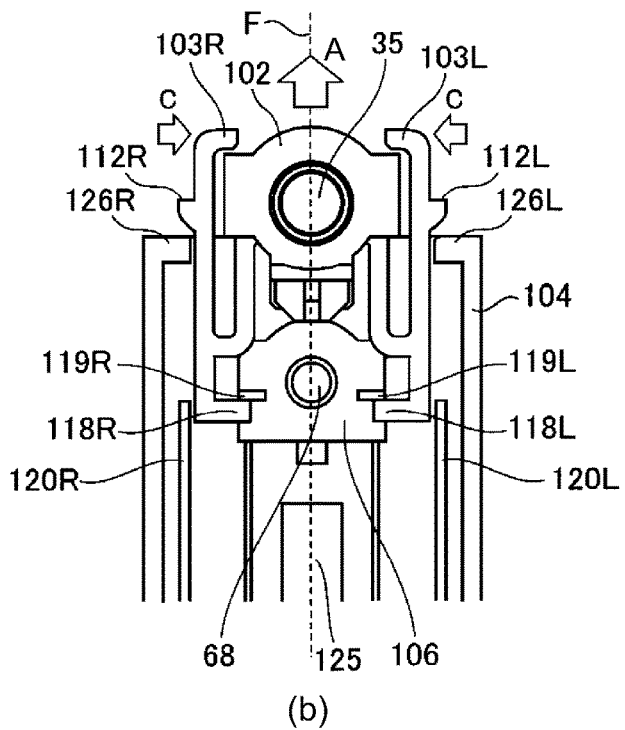

Parts (a) and (b) of FIG. 9 are a combination of a perspective and front views of the bearing device in the other embodiment of the present invention, which is for describing the configuration and operation of the apparatus.

Figure 10:
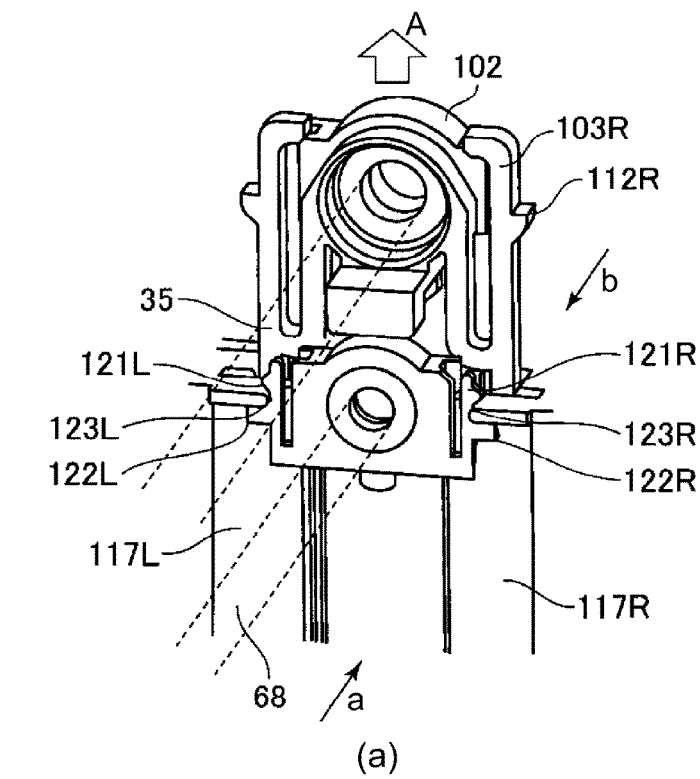
Figure 10:
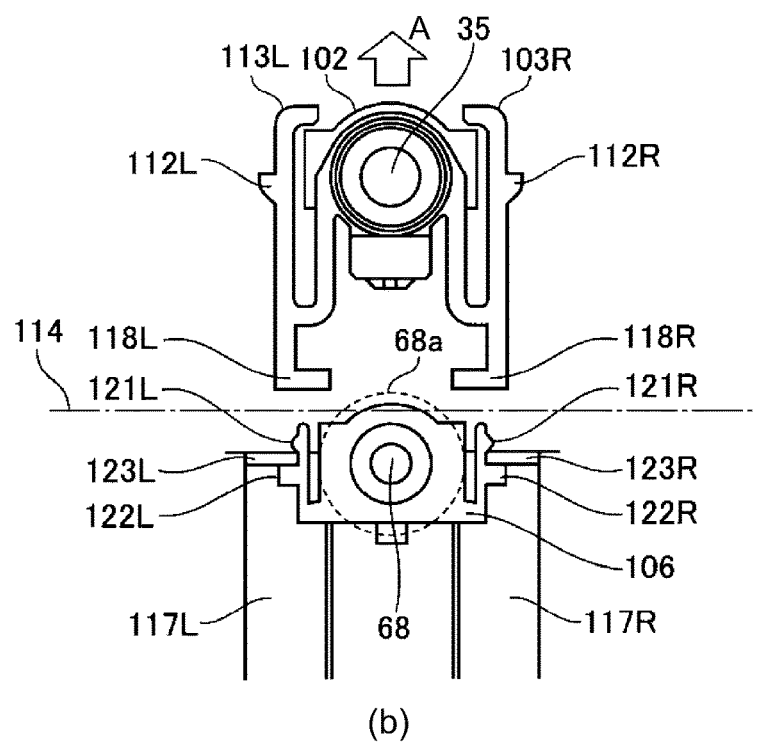

Parts (a) and (b) of FIG. 10 is a combination of the perspective and front views of the bearing device in the other embodiment, which is for describing the configuration and operation of the apparatus.

DESCRIPTION OF THE EMBODIMENTS

Hereinafter, a bearing device, a transferring device, and an image forming apparatus, which are in accordance with the present invention are described in greater detail with reference to drawings.

Embodiment 1

1. General Configuration and Operation of Image Forming Apparatus

FIG. 1 is a sectional view of the image forming apparatus 1 in this embodiment. The image forming apparatus 1 is an electrophotographic multifunctional image forming apparatus capable of functioning as a copying machine, a printing machine, and a facsimileing machine. It is of the so-called tandem type. It is capable of forming a full-color image. Further, it employs an intermediary transferring method.

The image forming apparatus 1 has multiple (four) image forming portions, more specifically, the first to fourth image forming portions SY, SM, SC and SK which form yellow (Y), magenta (M) cyan (C) and black (K) monochromatic toner images, respectively. In this embodiment, the image forming portions SY, SM, SC and SK are practically the same in configuration and operation, although they are different in the color of the toner they use during a development process, which will be described later. Thus, they are described together without showing the suffixes Y, M, C and K, which indicate the color of the monochromatic toner images they form. In this embodiment, the image forming portion S has a photosensitive drum 11, a charge roller 12, an exposing apparatus 13, a developing apparatus 14, the primary transfer roller 17, a drum cleaning apparatus 15, etc., which will be described later.

The photosensitive drum 11 is a photosensitive member (electrophotographic photosensitive member) of the drum type. It is the first image bearing member which bears toner. It is rotationally driven in the direction (clockwise direction) indicated by an arrow mark R1 in the drawing. As it is rotationally driven, its peripheral surface is uniformly charged to a preset polarity (which in this embodiment is negative) by the charge roller 12 as a charging means. The uniformly charged peripheral surface of the photosensitive drum 11 is exposed by the exposing apparatus 13 (laser scanner) as an exposing means; it is scanned by a beam of laser light projected by the exposing apparatus 13 while being modulated according to the information of the image to be formed. As a result, an electrostatic latent image (electrostatic image) is effected on the photosensitive drum 11. The exposing apparatus 13 is configured as a single unit which exposes all the photosensitive drums, 11Y, 11M, 11C and 11K of the image forming portions SY, SM, SC and SK, respectively. The electrostatic latent image formed on the peripheral surface of the photosensitive drum 11 is developed into a toner image (visible image) by the developing apparatus 14, as a developing means, which uses toner as developer. Consequently, a visible image, or a toner image, is formed on the photosensitive drum 11.

The image forming apparatus 1 is provided with an intermediary transfer belt 61, as an intermediary transferring member, which is the second image bearing member which bears toner. The belt 61 is an endless belt. It is disposed so that it opposes all of the photosensitive drums 11Y, 11M, 11C and 11K of the image forming portions SY, SM, SC and SK, respectively. The image forming apparatus 1 is also provided with the primary transfer rollers 17 (17Y, 17M, 17C and 17K), as a primary transferring members, which are the primary transferring means. The primary transfer rollers 17 are disposed on the inward side of the loop (belt loop) which the intermediary transfer belt 61 forms, in such a manner that they oppose the corresponding photosensitive drums 11, with the presence of the intermediary transfer belt 16 between them and the corresponding photosensitive drums. To each of the primary transfer rollers 17, a preset amount of pressure and a preset amount of electrostatic bias (load) are applied in the primary transferring portion N1 (part (a) of FIG. 2), which will be described later. Thus, the toner image formed on the photosensitive drum 11 is transferred (primary transfer) onto the intermediary transfer belt 61, which is rotating in the direction (counterclockwise direction) indicated by an arrow mark R2 in the drawing. During the primary transfer process, the primary transfer voltage (primary transfer bias), more specifically, DC voltage which is opposite in polarity (positive in this embodiment) from the polarity (normal polarity) to which toner is charged for development, is applied to the primary transfer roller 17. For example, during the formation of a full-color image, the yellow, magenta, cyan, and black toner images formed on the four photosensitive drums 11, one for one, are sequentially transferred in layers onto the intermediary transfer belt 61. The toner (primary transfer residual toner) which is remaining on the photosensitive drums 11 after the completion of the primary transfer process is removed and recovered from the photosensitive drums 11, by the drum cleaning apparatus 15 as a photosensitive member cleaning means.

Meanwhile, sheets P of transfer medium (sheets of recording paper, for example), as objects onto which toner images are transferred, are fed one by one from a transfer medium storage cassette 20, into the main assembly of the image forming apparatus 1. Then, each sheet P of recording medium (paper) is conveyed to a pair of registration rollers 23 while the registration rollers 23 are kept stationary. Thus, as the sheet P comes into contact with the nip between the pair of registration rollers 23, it is temporarily stopped by the nip while being pushed forward by the feed roller of the cassette 20. Thus, the sheet P is slightly bent against the resiliency of the sheet P. Consequently, the sheet P corrects itself in attitude, if it happens to be askew. Thereafter, the sheet P is conveyed through the area of contact between the intermediary transfer belt 61 and secondary transfer outside roller 35, by the pair of registration rollers 23, with such timing that the sheet P arrives at the area of contact at the same time as the toner images on the intermediary transfer belt 61. Then, it is conveyed through the area of contact between the intermediary transfer belt 61 and secondary transfer outside roller 35, that is, the secondary transferring portion N2 (part (a) of FIG. 2), which will be described later, while remaining sandwiched between the intermediary transfer belt 61 and secondary transfer outside roller 35. While the sheet S is conveyed through the secondary transferring nip portion N2, a combination of a preset amount of pressure and a preset amount of electrostatic force (bias) is applied to the sheet P and the toner images thereon. Thus, the toner images on the sheet S are transferred (secondary transfer) onto the sheet S. How the secondary transferring portion N2 is supplied with electric power is described layer. The toner (secondary transfer residual toner) which is remaining on the intermediary transfer belt 61 after the completion of the secondary transfer process is removed and recovered from the intermediary transfer belt 61 by the belt cleaning apparatus 70 as a means for cleaning the intermediary transferring member.

After the transfer of the toner images onto a sheet P of transfer medium, the sheet P and the toner images thereon are heated and pressed by a fixing apparatus 40 as a fixing means. Consequently, the toner images are fixed to the sheet P; they are melted, and become permanently attached to the sheet P as they cool down. Thereafter, the sheet P is discharged (outputted) onto a delivery tray (50 by a pair of discharge rollers 41.

In this embodiment, the photosensitive drum 11, charge roller 12, developing apparatus 14, and drum cleaning apparatus 15, which make up each image forming portion S are integrally disposed in a cartridge, making up a process cartridge 10 (FIG. 3) which is removably installable in the main assembly 2 of the image forming apparatus 1.

2. Transferring Portion

Next, the transferring portion in this embodiment is described about its configuration. Part (a) of FIG. 2 is a sectional view of the intermediary transfer belt 61 and its adjacencies. It is for describing the configuration of the transferring portion in this embodiment.

The intermediary transfer belt 61 is supported and tensioned by multiple rollers which are rotatably supported by a frame (unshown). The multiple rollers are: the secondary transfer inside roller 62; a secondary transfer front roller 63 which is on the upstream side of the secondary transfer inside roller 62 in terms of the rotational direction of the intermediary transfer belt 61; and a tension roller 64 which is on the upstream side of the secondary transfer front roller 63 in terms of the rotational direction of the intermediary transfer belt 61.

As the secondary transfer inside roller 62 is rotationally driven in the direction (counterclockwise direction) indicated by an arrow mark R3 in the drawing, the intermediary transfer belt 61 rotates (circularly moves) in the direction (counterclockwise direction) indicted by an arrow mark R2 in the drawing. Each of the primary transfer rollers 17Y, 17M, 17C and 17K is disposed on the inward side of the loop (belt loop) which the intermediary transfer belt 61 forms. In terms of the moving direction of the intermediary transfer belt 61, the four primary transfer rollers 17 are between the tension roller 64 and secondary transfer front roller 63. Each primary transfer roller 17 is pressed toward the corresponding photosensitive drum 11 with the presence of the intermediary transfer belt 61 between the primary transfer roller 17 and photosensitive drum 11, forming thereby the primary transferring portion N1 (primary transfer nip), that is, the area of contact between the photosensitive drum 11 and intermediary transfer belt 61.

The transferring portion is provided with the secondary transfer outside roller 35, which is disposed on the outward side of the belt loop, being positioned so that it opposes a secondary transfer inside roller 62. The secondary transfer outside roller 35 is pressed toward the secondary transfer inside roller 62, which opposes the secondary transfer outside roller 35, with the presence of the intermediary transfer belt 61 between the two rollers 35 and 62, forming thereby the secondary transferring portion N2 (secondary transfer nip), that is, the area of contact between the secondary transfer outside roller 35 and intermediary transfer belt 61. In this embodiment, a combination of the secondary transfer outside roller 35 which is the first secondary transferring member (second secondary transfer roller), and the secondary transfer inside roller 62, makes up the secondary transferring means. The secondary transfer inside roller 62 is an elastic roller, which is made up of a metallic core, and a surface layer formed of electrically conductive rubber, on the peripheral surface of the metallic core. The secondary transfer outside roller 35 also is an elastic roller, which is made up of a metallic core, and a surface layer formed of electrically conductive sponge rubber, on the peripheral surface of the metallic core. In this embodiment, the material for the electrically conductive sponge rubber of which the surface layer of the secondary transfer outside roller 35 contains ion-conductive agent.

The tension roller 64 provides the intermediary transfer belt 61 with a preset amount of tension. The secondary transfer front roller 63 makes the intermediary transfer belt 61 flat, between itself and tension roller 64, where the toner image is transferred from the photosensitive drum 11 onto the intermediary transfer belt 61, in each of the primary transferring portion N1.

part (a) of FIG. 2 is a schematic sectional view of the secondary transferring portion N2 and its adjacencies in this embodiment. It is for showing how the secondary transferring portion is supplied with electric power. The secondary transfer inside roller 62 is in connection to a secondary transfer power source 320 (high voltage power source circuit). The secondary transfer power source 320 applies the secondary transfer voltage (secondary transfer bias) to the metallic core of the secondary transfer inside roller 62 during the secondary transfer process. The secondary transfer voltage is such DC voltage that is the same in polarity (which is negative in this embodiment) as the toner. In this embodiment, the voltage which the secondary transfer power source 320 applies to the secondary transfer inside roller 62 is controlled so that it remains stable at a preset level. Further, the metallic core of the secondary transfer outside roller 35 is grounded (in connection to ground).

Further, the peripheral surface of the secondary transfer outside roller 35 is in contact with the peripheral surface of a power supply roller 68, which is a power supplying member. The power supply roller 68 is made up of a metallic roller having a metallic surface. While the image forming apparatus 1 is in operation, the rotational axis of the secondary transfer outside roller 35 and that of the power supply roller 68 are roughly parallel to each other. In this embodiment, the secondary transfer outside roller 35 is 24.74 mm in diameter, whereas the power supply roller 68 was 8 mm in diameter. Further, in this embodiment, the power supply roller 68 is disposed in the opposite adjacencies of the secondary transfer outside roller 35 from the secondary transfer inside roller 62.

The power supply roller 68 is in connection to a power supplying member power source 420 (high voltage power source circuit). During the secondary transfer process, the electrically conductive agent in the outward portion of the surface layer of the secondary transfer outside roller 35 in terms of the radius direction of the roller 35 is likely to become positively charged, whereas the electrically conductive agent in the inward portion of the surface layer of the secondary transfer outside roller 35 is likely to become negatively charged. During the secondary transfer process, therefore, the power supplying member power source 420 supplies the secondary transfer outside roller 35 with such electrical current that flows in the direction to moderate this polarization of the surface layer (direction to cancel polarization of surface layer). That is, in this embodiment, the power supplying member power source 420 applies to the power supply roller 68, power supplying member voltage (power supplying member bias), which is such DC voltage that is the same in polarity as the normal toner charge. In this embodiment, the voltage, which the power supplying member power source 420 applies to the secondary transfer outside roller 35, is controlled so that the amount of the electrical current flowed by the voltage remains constant.

As described above, the transferring device 4, which is for the secondary transfer, has: the secondary transfer outside roller 35, which is the first roller for transferring toner from the intermediary transfer belt 61, which is for bearing toner, onto a sheet P of transfer medium; and the power supply roller 68 which is the second roller, for supplying the secondary transfer outside roller 35 with electric current. The intermediary transfer belt 61 is an example of intermediary transferring medium, onto which toner is transferred (primary transfer) from another image bearing medium to be transferred (secondary transfer) onto the final transfer medium. In this embodiment, this transferring device 4 is provided with a bearing device 3 (Part (a) of FIG. 4 and part (a) of FIG. 4), which will be described later.

By the way, although, in this embodiment, the secondary transfer power source 320, which is controlled so that it remains constant in voltage, was employed in combination with the power supplying member power source 420, which is controlled so that it remains constant in the amount of electric current, the combination is optional. However, in consideration of the performance of the transferring device 4, the cost of the high voltage power source, and the like factors, the combination in this embodiment is advantageous.

Further, by configuring the transferring device 4 so that the secondary transferring portion N2 is supplied with power as in this embodiment, not only is it possible to keep the high voltage power sources which are to be used for the secondary transfer process, no greater in capacity than any conventional transferring device, but also, to afford more latitude in terms the positioning of the power supply roller 68, compared to the transferring device configuration disclosed in Japanese Laid-open Patent Application No. 2005-316200.

3. Mechanism for Allowing Secondary Transfer Roller to Be Replaced

Next, the mechanism for allowing the secondary transfer outside roller 35 to be replaced is described about its general configuration. By the way, regarding the orientation of each element of the image forming apparatus 1, in the following description of this mechanism, the side of each element, which faces the front side of the sheet of paper on which FIG. 1 is, is referred to as "front side" of the element, whereas the side of the element, which corresponds in position to the rear side of the sheet P of paper, on which the drawing is, is referred to as "rear side". When the image forming apparatus 1 is in operation, the straight line between the "front side" and "rear side" is roughly parallel to the axial line of the secondary transfer outside roller 35 and that of the power supply roller 68. Further, the direction parallel to this straight line may sometimes be referred to as "thrust direction". Moreover, the direction in which a sheet P of recording medium is conveyed through the secondary transferring portion N2 may sometimes be referred to simply as the "conveyance direction".

The image forming apparatus 1 is provided with the right door unit 92 for exposing the interior of the apparatus main assembly 2. As seen from the front side of the apparatus main assembly 2, the right door unit 92 is attached to the right side of the apparatus main assembly 2. Referring to FIG. 3, the right door unit 92 is pivotally movable downward about a shaft 92, with which the bottom portion of the apparatus main assembly 2 is provided, in order to expose the interior of the apparatus main assembly 2. Further, the right door unit 92 is provided with a hook 92b, which is attached to the top edge portion of the right door unit 92. As the right door unit 92 is upwardly pivoted, the hook 92 engages with the apparatus main assembly 2, and keeps the right door unit 92 closed. Further, the right door unit 92 is provided with a door unlocking portion (unshown) which is to be used to disengage the hook 92 from the apparatus main assembly 2 to allow the right door unit 92 to be opened.

As the right door unit 92 is opened, the passage through which a sheet P of transfer medium is conveyed from the transfer medium storage cassette 20 to the fixing apparatus 40 through the secondary transferring portion N2, is divided into the front side which corresponds to the top surface of the sheet P (onto which toner image is transferred), and the rear side. That is, as the right door unit 92 is opened, the bearing device 3 (which will be described later) to which the secondary transfer outside roller 35 is attached, moves with the right door unit 92 in such a manner that the secondary transfer outside roller 35 is separated from the intermediary transfer belt 61. Thus, when it is necessary to replace the secondary transfer outside roller 35, an operator is to open the right door unit 92 to access the bearing device 3.

Part (a) of FIG. 4 is a perspective view of the bearing device 3 having a bearing holder 104 which holds the bearings by which the secondary transfer outside roller 35 and power supply roller 68 are borne. The bearing device 3 has: a front transfer medium guide 100 and a transfer medium separation guide 101, which are on the upstream and downstream sides, respectively, of the secondary transfer outside roller 35 in terms of the conveyance direction. The transfer medium front guide 100 and transfer medium separation guide 101 are disposed in the adjacencies of the opening 104a of the bearing holder 104 to guide a sheet P of transfer medium as the sheet P is conveyed by the secondary transfer outside roller 35. They are examples of the conveyance guides with which the bearing holder 104 is provided. Referring to part (b) of FIG. 4, an operator can remove the secondary transfer outside roller 35, together with the first bearing member 102, from the bearing holder 104 by manipulating the release levers 103 of the first bearing member 102 which holds the secondary transfer outside roller 35. In this embodiment, the separation guide 101 is in connection to the first bearing member 102. Thus, as the secondary transfer outside roller 35 and first bearing member 102 are removed, the separation guide 101 separates from the bearing holder 104, together with the secondary transfer outside roller 35 and first bearing member 102. The details of this operation will be given later.

In this embodiment, of the secondary transfer outside roller 35 and power supply roller 68, the secondary transfer outside roller 35, which is more likely to be necessary to be replaced than the power supply roller 68, can be replaced without removing the power supply roller 68.

However, it is sometimes necessary to remove the contaminants such as toner on the peripheral surface of the power supply roller 68. In such a case, an operator is to remove the secondary transfer outside roller 35 from the bearing holder 104 as described above, and then, access the power supply roller 68 without removing the bearing holder 104. However, the power supply roller 68 is in the innermost area of the bearing device 3, that is, the opposite side from where a part of the peripheral surface of the secondary transfer outside roller 35 is exposed from the bearing device 3. In this embodiment, the image forming apparatus 1 is configured so that as the right door unit 92 is opened, the secondary transfer outside roller 35 is exposed upward, and the power supply roller 68 is positioned below the secondary transfer outside roller 35. Further, in consideration of recording medium conveyance, the clearance between the secondary transfer outside roller 35 and secondary transfer front guide 101 (which is on upstream side of secondary transfer outside roller 35 in terms of the conveyance direction, and the clearance between the secondary transfer outside roller 35 and separation guide (which is on downstream side of secondary transfer outside roller 35), are set as small as possible. In this embodiment, the power supply roller 68 can be easily accessed, in spite of the above-described clearance.

4. Bearing Device

Next, the bearing device 3 in this embodiment is described further. Part (a) of FIG. 5, part (b) of FIG. 5, part (a) of FIG. 6 and part (b) of FIG. 6 are sectional views of the adjacencies of the one (rear end) of the lengthwise ends of the bearing device 3 in terms of the thrust direction. They show the configuration of the end portion. By the way, for convenience sake, a plane which coincides with the rotational axis of the secondary transfer outside roller 35 when the roller 35 is borne by the bearing device 3, and which is roughly parallel to the direction in which the secondary transfer outside roller 35 is pressed toward the secondary transfer inside roller 62, may be sometimes referred to as "central plane F" (Part (a) of FIG. 5). The suffixes "L" and "R", of the referential codes in these drawings means that an element of the bearing device 3, to which a referential code having the suffix "L" or "R" is given, is on the upstream and downstream sides, respectively, of the central plane F in terms of the conveyance direction. When the upstream and downstream elements are mentioned together, the suffixes are eliminated.

In this embodiment, the bearing device 3 is provided with a pair of structural means for supporting the secondary transfer outside roller 35 and power supply roller 68, which are at the ends of the bearing device 3, one for one, in terms of the thrust direction. It is also provided with a pair of structural means for moving the power supply roller 68, which also are at the ends of the bearing device 3, one for one, in terms of the thrust direction. Further, the pair of structural means for supporting the two rollers 35 and 68 are practically symmetrically positioned with reference to the aforementioned central plane F which is roughly perpendicular to the thrust direction, and so are the pair of structural means for moving the power supply roller 68. Thus, these structural means are described with reference to one end of the bearing device 3 in terms of the thrust direction.

The bearing device 3 comprises: the secondary transfer outside roller 35 (first roller); power supply roller 63 (second roller); first bearing member 102 which rotatably supports the secondary transfer outside roller 35; and second bearing member 106 which rotatably supports the power supply roller 68. Further, it comprises also the bearing holder 104 which removably supports the first bearing member 102, and movably supports the second bearing member 106. After the attachment of the first bearing member 102 to the bearing holder 104, at least a part of the peripheral surface of the secondary transfer outside roller 35 remains outwardly protrusive from the bearing holder 104, through the opening (Part (a) of FIG. 4 and part (b) of FIG. 4) with which the bearing holder 104 is provided. Further, after the attachment of the first bearing member 102 to the bearing holder 104, the power supply roller 68 remains in contact with the secondary transfer outside roller 35, within the bearing holder 104 (Part (a) of FIG. 2 and part (b) of FIG. 2).

Part (a) of FIG. 5 shows one of the lengthwise end portions of the bearing device 3 when the secondary transfer outside roller 35 is remaining pressed against the secondary transfer inside roller 62 with the presence of the intermediary transfer belt 61 between the two rollers 35 and 62. The first bearing member 102 is supported by the bearing holder 104 in such a manner that it is allowed to move in parallel to (linearly) to the first bearing rail 105 with which the bearing holder 104 is provided. Further, the first bearing member 102 is under the pressure generated by first pressure generating member 111 (which is a compression spring) placed on the spring seat (unshown) of the bearing holder 104, in the direction indicated by an arrow mark A in Part (a) of FIG. 5, that is, toward the rotational axis of the secondary transfer inside roller 62.

As for the second bearing member 106, it is in connection to an arm 108, which can be rotated about an axle 107. That is, in this embodiment, the second bearing member 106 is an integral part of one of the lengthwise ends of the arm 108. The axle 107 of the arm 108 is attached to the bearing holder 104. That is, the second bearing member 106 is supported by the bearing holder 104 in such a manner that it is allow to move relative to the bearing holder 104 by being attached to the arm 108. Further, the arm 108 is kept under the pressure generated by the second pressure generating member 109 (which is compression spring) in the direction indicated by an arrow mark B in Part (a) of FIG. 5, that is, in the direction to cause the second bearing member 106 to pivotally move toward the opening 104a of the bearing holder 104, about the axle 107. One end of the second pressure generating member 109 is attached to the bearing holder 104, whereas the other end is attached to the opposite end of the arm 108 from the second bearing member 106. Thus, the contacting portion 115 of the second bearing member 106 comes into contact with the arm catching portion 110 of the first bearing member 102. As the contacting portion 106 comes into contact with the arm catching portion 110, the first bearing member 102 is precisely positioned relative to the second bearing member 106. That is, the distance between the rotational axis of the secondary transfer outside roller 35 and that of the power supply roller 68 becomes fixed. Then, the secondary transfer outside roller 35 is pressed against the secondary transfer inside roller 62 with the presence of the intermediary transfer belt 61 between the two rollers 35 and 62 while maintaining this distance between the two rotational axes.

The first bearing member 102 has a pair of elastic release levers 103L and 103R, which are provided with protrusive portions 112L and 112R, which engage with the protrusive portions 126L and 126R of the bearing holder 104 to keep the first bearing member 102 attached to bearing holder 104.

If an operator wants to remove the secondary transfer outside roller 35 from the bearing holder 104, the operator is to press the release levers 103L and 103R of the first bearing member 102 in the direction indicated by a pair of arrow marks C in Part (a) of FIG. 5, that is, toward the central plane F, to bend the release levers 103L and 103R in the direction indicated by the arrow marks C. As the release levers 103L and 103R are elastically bent, the protrusive portions 112L and 112R are retracted in the direction indicated by a pair of arrow marks D, that is, toward the central plane F. Consequently, they become disengaged from the protrusive portions 126L and 126R, respectively, of the bearing holder 104, allowing thereby the first bearing member 102 to be pulled out of the bearing holder 104 in the direction indicated by an arrow mark A in Part (a) of FIG. 5. Consequently, the combination of the secondary transfer outside roller 35 and first bearing member 102 is removed from the bearing holder 104 as shown in part (b) of FIG. 5.

As the first bearing member 102 is removed from the bearing holder 104, the arm 108 is rotationally moved in the direction (clockwise direction) indicated by an arrow mark B in Part (a) of FIG. 5 and part (b) of FIG. 5 by the pressure generated by the second pressure generating member 109. The rotational movement of the arm 108 is stopped by the contact between the arm 108, and a stopper 113 with which the bearing holder 104 is provided, which occurs as the arm 108 is rotationally moved. That is, as the arm 108 is rotationally moved, the power supply roller 68 is moved toward the opening 104a of the bearing holder 104. Referring to Part (a) of FIG. 5, after the removal of the first bearing member 102 from the bearing holder 104, at least a part of the peripheral surface 68a of the power supply roller 68 remains outwardly protrusive from the bearing holder 104 through the opening 104a of the bearing holder 104. That is, in this embodiment, after the removal of the first bearing member 102 from the bearing holder 104, at least a part of the peripheral surface 68a of the power supply roller 68 is on the outward side (top side in drawing) of the plane 114 which coincides with the recording medium conveyance passage 114, in the upstream and downstream adjacencies of the secondary transferring portion N2 when the image forming apparatus 1 is in operation. That is, in this embodiment, after the removal of the first bearing member 102 from the bearing holder 104, the power supply roller 68 is held by the power supply roller moving means, in the position in which at least a part of its peripheral surface remains protrusive above the conveyance guides 100 and 101. By the way, the abovementioned conveyance passage plane 114 roughly coincides with the straight line which coincides with the secondary transferring portion N2 and is perpendicular to the straight line between the rotational axis of the secondary transfer inside roller 62 and that of the secondary transfer outside roller 35. As described above, in this embodiment, as the secondary transfer outside roller 35 is removed from the bearing holder 104, the power supply roller 68 moves into the position in which the power supply roller 68 can be easily accessed by an operator. Therefore, it is easier to clean the power supply roller 68.

Referring to Part (a) of FIG. 6, the procedure to attach the secondary transfer outside roller 35 to the bearing holder 104 is as follows: First, the first bearing member 102 is to be inserted by an operator into the bearing holder 104 along the first bearing rail 105 of the bearing holder 104. As the first bearing member 102 is inserted into the bearing holder 104, the protrusive portions 112L and 112R of the first bearing member 102 engage with the protrusive portions 126L and 126R of the bearing holder 104, as shown in part (b) of FIG. 6, completing the process of attaching the first bearing member 102 to the bearing holder 104. The state of the bearing device 3, which is shown in part (b) of FIG. 6 is the "state of the bearing device 3, which is after the completion of the process of attaching the first bearing member 102 to the bearing holder 104". Hereafter, the position in which the first bearing member 102 is in part (b) of FIG. 6 may be referred to as "attachment position T1".

As described above, the bearing device 3 has the contacting portion 115, with which the second bearing member 106 is provided. As the first bearing member 102 is inserted into the bearing holder 104, the contacting portion 115 comes into contact with the first bearing member 102, precisely positioning thereby the first and second bearing members 102 and 106 relative to each other. Further, the bearing device 3 has the following moving means. That is, as the first bearing member 102 is removed from the bearing holder 104, this moving means moves the second bearing member 106 toward the opening 104a of the bearing holder 104. Further, after the removal of the first bearing member 102 from the bearing holder 104, the moving means holds the second bearing member 106 in such a position that at least a part of the peripheral surface of the power supply roller 68 remains protrusive outward of the bearing holder 104 through the opening 104a. In this embodiment, this moving means comprises the arm 108 and the second pressure generating member 109. The arm 108 is connected to the second bearing member 106, and is rotatably attached to the bearing holder 104. The second pressure generating member 109 keeps the arm 108 pressured in the direction to cause the arm 108 to rotationally move in the direction to cause the second bearing member 106 to move toward the opening 104a. Further, after the attachment of the first bearing member 102 to the bearing holder 104, the arm 108 remains under the pressure generated by the second pressure generating member 109. Therefore, the contacting portion 115 is kept in contact with the first bearing member 102 by the pressure generated by the second pressure generating member 109. Further, the second bearing member 106 is under the pressure generated and transmitted thereto through the arm 108. Thus, as the first bearing member 102 is removed from the bearing holder 104, the second bearing member 106 moves toward the opening 104a. Further, even after the removal of the first bearing member 102 from the bearing holder 104, the second bearing member 106 remains under the pressure generated by the second pressure generating member 109 and transmitted thereto through the arm 108. Thus, the second bearing member 106 is held in such a position that keeps at least a part of the peripheral surface of the power supply roller 68 protrusive outward of the bearing holder 104 through the opening 104a.

The procedure for attaching the secondary transfer outside roller 35 and first bearing member 102 to the bearing holder 104 is as follows: Referring to Part (a) of Figure, as the combination of the secondary transfer outside roller 35 and first bearing member 102 is inserted into the bearing holder 104, the collision prevention protrusion 116 with which the second bearing member 106 is provided comes into contact with the arm catching portion 110 of the first bearing member 102, preventing thereby the peripheral surface of the secondary transfer outside roller 35 and that of the power supply roller 68 from contacting each other during the early stage of the insertion of the first bearing member 102 into the bearing holder 104. Then, as the first bearing member 102 is inserted further into the bearing holder 104, the arm 108 is rotationally moved by the first bearing member 102 in the direction (counterclockwise direction) indicated by an arrow mark E in Part (a) of FIG. 6 against the pressure generated by the second pressure generating member 109, in such a manner that the portion of the arm 108, which is holding the power supply roller 68, is pushed into the bearing holder 104, until the first bearing member 102 is moved into the aforementioned attachment position T1, as shown Part (a) of FIG. 6. By the time when the first bearing member 102 reaches the attachment position T1, the collision prevention protrusion 116 will have been retreated from the arm catching portion 110 of the first bearing member 102, because the collision prevention protrusion 116 rotationally moves with the arm 108 about the axle 107. That is, after the attachment of the first bearing member 102 to the bearing holder 104, the contacting portion 115 remains in contact with the arm catching portion 110, and the peripheral surface of the power supply roller 68 remains in contact with the peripheral surface of the secondary transfer outside roller 35. It is the moment when the contacting portion 115 comes into contact with the arm catching portion 110 that the peripheral surface of the power supply roller 68 comes into contact with the peripheral surface of the secondary transfer outside roller 35 for the first time. Thus, this embodiment can prevent the problem that the elastic layer of the secondary transfer outside roller 35 is damaged because the peripheral surface of the secondary transfer outside roller 35 and that of the power supply roller 68 are pressed against each other by a substantial amount of force (pressure).

As described above, in this embodiment, the bearing device 3 has such a separating means that is described next. That is, during the initial stage of the procedure for attaching the first bearing member 102 to the bearing holder 104, the separating means keeps the power supply roller 68 separated from the secondary transfer outside roller 35, whereas after the attachment of the first bearing member 102 to the bearing holder 104, the separating means allows the power supply roller 68 to be in contact with the secondary transfer outside roller 35. In this embodiment, this separating means is embodied as the collision prevention protrusion 116, that is, a protrusive portion, with which the second bearing member 106 is provided, and which comes into contact with the first bearing member 102.

By the way, all that is required of the collision prevention protrusion 116 is that it keeps the power supply roller 68 separated from the secondary transfer outside roller 35 during the first stage of the procedure for attaching the first bearing member 102 to the bearing holder 104, and during at least a part of the period in which the first bearing member 102 is moved toward the attachment position T1. In this embodiment, the collision prevention protrusion 116 is positioned to keep the peripheral surface of the power supply roller 68 separated from the peripheral surface of the secondary transfer outside roller 35 during the period from when an operator begins to attach the first bearing member 102 to the bearing holder 104, to immediately before the first bearing member 102 reaches its attachment position T1. Further, in this embodiment, the collision prevention protrusion 116 is a protrusion with which the second bearing member 106 is provided, and which comes into contact with the first bearing member 102. However, this embodiment is not intended to limit the present invention in scope in terms of which component of the bearing device 3 is provided with the collision prevention protrusion 116. For example, it may be the arm 108, that is, a member which moves with the second bearing member 106, that is provided with the collision prevention protrusion 116, or it may be such a projection that contacts a member which moves with the first bearing member 102. Moreover, the collision prevention protrusion 116 may be embodied as a projection with which the first bearing member 102, or a member which moves with the first bearing member 102, is provided, and which contacts the second bearing member 106, or the member which moves with the second bearing member 106. For example, referring to Part (a) of FIG. 7, it may be the first bearing member 102 that is provided with the collision prevention protrusion 116 which comes into contact with the arm 108 during the initial stage of the procedure to attach the first bearing member 102 to the bearing holder 104. Next, referring to part (b) of FIG. 7, after the attachment of the first bearing member 102 to the bearing holder 104, the collision prevention protrusion 116 remains in the recess 108a (retreat) with which the arm 108 is provided. Thus, it is possible for the contacting portion 115 of the second bearing member 106 to contact the arm catching portion 110 of the first bearing member 102, and for the power supply roller 68 to contact the secondary transfer outside roller 35.

As described above, according to this embodiment, it is possible to easily replace the secondary transfer outside roller 35 without involving the power supply roller 68. Further, it is possible to improve an image forming apparatus in the efficiency with which the power supply roller 68 can be cleaned after the removal of the secondary transfer outside roller 35. That is, this embodiment of the present invention related to the structure for supporting the first and second rollers can make it possible to remove the first roller without involving the second roller, and also, to improve the structure in the efficiency with which the second roller can be cleaned.

Embodiment 2

Next, another embodiment of the present invention is described. The image forming apparatus in this embodiment is the same in basic configuration and operation as the one in the first embodiment. Thus, the elements of the image forming apparatus in this embodiment, which are the same as, or correspond to, the counterparts in the first embodiment, in function or configuration, are given the same referential codes as those given to the counterparts in the first embodiment, and are not described here.

Part (a) of FIG. 8 is a perspective view of one end (rear end) and its adjacencies of the bearing device 3 in this embodiment, as seen from the inward side of the bearing device 3 in terms of the thrust direction, when the first bearing member 102 is in its attachment position T1. It shows the configuration of the rear end of the bearing device 3 and its adjacencies. The first bearing member 102 is supported by the bearing holder 104 in such a manner that it is enabled to move along the pair of first bearing rails 105 with which the bearing holder 104 is provided. Further, the second bearing member 106 is supported by the bearing holder 104 in such a manner that it is enabled to move along the pair of bearing rails 117 with which the bearing holder 104 is provided. In this embodiment, the first and second bearing members 102 and 106 are roughly the same in the direction of their movement. Further, the first bearing member 102 is under the pressure generated by the first pressure generating member 111 (unshown) (which is a compression spring) placed on the spring seat (unshown) of the bearing holder 104, in the direction indicated by an arrow mark A in Part (a) of FIG. 8. That is, the first bearing member 102 is kept pressured toward the rotational axis of the secondary transfer inside roller 62. As for the second bearing member 106, it is under the pressure generated by the second pressure generating member 125 (which is compression spring) placed on the spring seat (unshown) of the bearing holder 104, in the direction indicated by the arrow mark A in Part (a) of FIG. 8. That is, the second bearing member 106 is kept pressured toward the first bearing member 102. Thus, the contacting portion 115 of the second bearing member 106 remains in contact with the contacting portion 110 of the first bearing member 102, whereby the first and second bearing members 102 and 106 are precisely positioned relative to each other. That is, the distance between the rotational axis of the first bearing member 102 and that of the second bearing member 106 is precisely set. Further, the secondary transfer outside roller 35 is pressed against the secondary transfer inside roller 62 with the presence of the intermediary transfer belt 61 between the two rollers 35 and 62, while maintaining this distance between the two axes.

Part (b) of FIG. 8 is a perspective view of one of the lengthwise end portions of the bearing device 3, and its adjacencies, as seen from the direction (thrust direction) indicated by an arrow mark b in Part (a) of FIG. 8 (first bearing rail 105 is not shown). The procedure to remove the secondary transfer outside roller 35 from the bearing holder 104 is as follows: First, an operator is to press the pair of release levers 103L and 103R of the first bearing member 102 in the directions indicated by a pair of arrow marks C. As the release levers 103 are pressed, the protrusive engaging portions 112L and 112R are retracted in the directions indicated by a pair of arrow marks D in part (b) of FIG. 8, being thereby disengaged from the engaging portions 126L and 126R, respectively, of the bearing holder 104. Thus, the first bearing member 102 can be pulled out of the bearing holder 104 in the direction indicated by an arrow mark A in part (b) of FIG. 8 along the first bearing rails 105 while the levers 103L and 103R are kept pressed. While the first bearing member 102 is pulled out, a pair of engaging portions 118L and 118R (lifting arms), with which the first bearing member 102 is provided, engage with a pair of protrusions 119L and 119R (lifting protrusions), respectively, with which the second bearing member 106 is provided. By the way, referring to part (b) of FIG. 8, the bearing device 3 is configured so that when the first bearing member 102 is in its attachment position T1, the engaging portions 118L and 118R remain disengaged from the protrusions 119L and 119R, respectively.

Part (a) of FIG. 9 is a perspective view of one of the lengthwise end portions of the bearing device 3, as seen from the same direction as the direction indicated in part (b) of FIG. 8, after the first bearing member 102 has been pulled up into the position in which the engaging portions 112L and 112R are positioned higher than the engaging portions 126L and 126R. Part (b) of FIG. 9 is a front view of the same end portion of the bearing device 3 as the one shown in Part (a) of FIG. 9, as seen from the direction indicated by an arrow mark b in Part (a) of FIG. 9. While the first bearing member 102 is pulled up, with the release levers 103R and 103L being pressed as described above, a regulating portion 120 (rib) with which the bearing holder 104 is provided is on the opposite side of the central plane F from the engaging portion 118L and 118R. Therefore, even if the levers 103L and 103R are pressed in the direction indicated by the arrow marks C, the engaging portions 118L and 118R are prevented from moving to the opposite side of the central plane F, and therefore, it does not occur that they disengage from the engaging portions 119L and 119R, respectively. Thereafter, the second bearing member 106 is pulled further upward along the second bearing rail 117, in the direction indicated by an arrow mark A in Part (a) of FIG. 9 and part (b) of FIG. 9, together with the first bearing member 102.

At this time, referring to Part (a) of FIG. 8, the second bearing member 106 has a pair of protrusion supporting portions 124L and 124R, which are elastically deformable. The protrusion supporting portions 124L and 124R are provided with temporarily holding portions 121L and 121R (temporarily holding protrusions), and locking portions 122L and 122R (limiter protrusions), respectively. Part (a) of FIG. 10 is a perspective view of one of the lengthwise end portions of the bearing device 3, as seen from the direction (from inward side in terms of thrust direction) indicated by the arrow mark a in Part (a) of FIG. 9, after the second bearing member 106 was pulled further upward from the position shown in Part (a) of FIG. 9.

As the second bearing member 106 is pulled further upward in the direction indicated by the arrow mark A in Part (a) of FIG. 9 from the position in which it is in Part (a) of FIG. 9, the engaging-retaining portions 121L and 121R come into contact with the holding portions 123L and 123R with which the second bearing rail 117 of the bearing holder 104 is provided. Then, as the second bearing member 106 is pulled further upward from the position in which the engaging-remaining portions 121L and 121R are in contact with the holding portions 123L and 123R, the protrusion supporting portions 124L and 124R are forced to elastically bend toward the central plane F, allowing thereby the engaging-retaining portions 121L and 121R to slip by the holding portions 123L and 123R, respectively. Further, the disengagement preventing portions 122L and 122R come into contact with the holding portions 123L and 123R, respectively. That is, the holding portions 123L and 123R enter between the engaging-holding portions 121L and 121R and disengagement preventing portions 122L and 122R as shown in part (a) of FIG. 10. Therefore, it becomes impossible for the second bearing member 106 to be pulled further upward, and the second bearing member 106 is held (temporarily) in this position, being prevented from falling. At this point in this procedure, the operator is to press the release levers 103L and 103R of the first bearing member 102 for the second time. As the levers 103L and 103R are pressed, movable engaging portions 118 retreat in the opposite direction from the central plane F (part (b) of FIG. 9), because at this point in this procedure, the regulating portions 120 are not on the opposite sides of the moving engaging portions 118L and 118R from the central plane F. Thus, the first bearing member 102 can be removed from the bearing holder 104, leaving the second bearing member 106 in the bearing holder 104. Part (b) of FIG. 10 is a front view of the above-described end portion of the bearing device 3, as seen from the direction indicated by the arrow mark a in part (a) of FIG. 10.

After the removal of the first bearing member 102 from the bearing holder 104, the second bearing member 106 is temporarily held in the bearing holder 104 by the engagement between the engaging-holding portions 121L and 121R and holding portions 123L and 123R, respectively, in such a position that at least a part of the peripheral surface 68a of the power supply roller 68 is protrusive outward of the bearing holder 104, through the opening 104a of the bearing holder 104. In this embodiment, at this point of operation, at least a part of the peripheral surface 68a of the power supply roller 68 remains on the outward side (top side in drawing) above the plane 114, which coincides with the plane of the passage through which a sheet P of recording medium is conveyed on the upstream and downstream sides of the secondary transferring portion N2 while the image forming apparatus 1 is in operation. That is, as the secondary transfer outside roller 35 is removed by an operator as described above, the power supply roller 68 moves into the position in which the operator can easily access the secondary transfer outside roller 35, making easier the operation to clean the power supply roller 68.

As described above, in this embodiment, the moving means has the moving-engaging portions 118L and 118R, and the engaging-holding portion 121L and 121R. The movable engaging portions 118L and 118R are parts of the first bearing member 102, and engage with the second bearing member 106. The engaging-holding portions 121L and 121R are part of the second bearing member 106, and engage with the bearing holder 104. Thus, as the first bearing member 102 is removed from the bearing holder 104, the movable engaging portions 118L and 118R engage with the second bearing member 106, causing thereby the second bearing member 106 to move toward the opening 104a, together with the first bearing member 102. Further, during the removal of the first bearing member 102 from the bearing holder 104, the engaging-holding portions 121L and 121R engage with the bearing holder 104. Thus, after the removal of the first bearing member 102 from the bearing holder 104, the second bearing member 106 is held in such a position in which at least a part of the peripheral surface of the power supply roller 68 remains protrusive outward of the bearing holder 104 through the opening 104a of the bearing holder 104. Further, after the insertion of the first bearing member 102 into the bearing holder 104, the second bearing member 106 remains under the pressure generated by the second pressure generating member 125, whereby the contacting portion 115 is made to remain in contact with the first bearing member 102. Further, in this embodiment, the first bearing member 102 has a disengaging portion which makes the movable engaging portions 118L and 118R disengage from the second bearing member 106 while the engaging-holding portions 121L and 121R remain engaged with the bearing holder 104. In this embodiment, the release levers 103L and 103R are the disengaging portions. The first bearing member 102 has the engaging portions 112L and 112R which keep the first bearing member 102 attached to the bearing holder 104 by engaging with the bearing holder 104. In this embodiment, the bearing device 3 is configured so that not only do the release levers 103L and 103R disengage the movable engaging portions 118L and 118R from the second bearing member 106, but also, disengage the engaging portions 112L and 112R from bearing holder 104.

By the way, in this embodiment, the procedure to attach the secondary transfer outside roller 35 to the bearing holder 104 is as follows: First, the engaging-holding portions 121L and 121R are disengaged from the holding portions 123L and 123R, respectively, allowing thereby the second bearing member 106 to fall onto the second pressure generating member 125, due to its own weight, together with the power supply roller 68. Then, an operator is to insert the first bearing member 102 into the bearing holder 104, toward the attachment position T1. During this insertion, the peripheral surface of the secondary transfer outside roller 35 comes into contact with the peripheral surface of the power supply roller 68 before the first bearing member 102 reaches the attachment position T1. In this embodiment, however, it is for a relatively short length of time immediately before the first bearing member 102 reaches the attachment position T1 that the secondary transfer outside roller 35 is pressed against the power supply roller 68. Thus, the damage which might be caused to the elastic layer of the secondary transfer outside roller 35 by the pressing of the secondary transfer outside roller 35 against the power supply roller 68 will not be serious enough to be problematic. In other words, in this embodiment, the engaging-holding portions 121L and 121R which can disengage the bearing holder 104 from holding portions 123L and 123R function as the separating means for keeping the secondary transfer outside roller 35 separated from the power supply roller 68 until the last stage of the attachment of the first bearing member 102 to the bearing holder 104. This separating means, however, allows the secondary transfer outside roller 35 and power supply roller 68 to remain in contact with each other after the attachment of the first bearing member 102 to the bearing holder 104.

As described above, according to this embodiment, the secondary transfer outside roller 35 can be easily replaced without involving the power supply roller 68, as the first embodiment. Further, according to this embodiment, it is possible to improve the image forming apparatus (bearing device) in the efficiency with which the power supply roller 68 can be cleaned after the removal of the secondary transfer outside roller 35, as the first embodiment. Further, according to this embodiment, the bearing device 3 is configured so that the first and second bearing members 102 and 106 move together in parallel. Thus, it is easier to simplify the bearing device 3 in configuration, and also, to reduce the bearing device in size.

MISCELLANIES

In the embodiments described above, the present invention was applied to the transferring device for the secondary transfer. These embodiments, however, are not intended to limit the present invention in scope in terms of an apparatus to which the present invention is applicable. For example, the present invention is also applicable to a transferring device for directly transferring a toner image from a photosensitive drum onto recording medium. Further, these embodiments are not intended to limit the present invention in scope in terms of an apparatus to which the present invention is applicable. That is, the present invention is applicable to any apparatus as long as the apparatus is configured so that its first and second rollers are supported by its bearing device, in order to make it possible to remove the first roller, that is, the outward one of the two rollers, without involving the second roller, and also, to make it easier to access the second roller to clean the second roller.

Not only can the present invention, which relates to an apparatus configured so that its first and second rollers are supported by its bearing device, make it possible to replace the first roller without involving the second roller, but also, to improve the apparatus in the efficiency with which the second roller can be cleaned.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-168552 filed on Aug. 30, 2016, which is hereby incorporated by reference herein in its entirety.

What is claimed is:

1. A bearing device for bearing a first roller and a second roller, said bearing device comprising:
    a first bearing member configured to rotatably support said first roller;
    a second bearing member configured to rotatably support said second roller;
    a bearing holder configured to dismountably support said first bearing member and dismountably support said second bearing member, wherein in a state that said first bearing member is mounted in said bearing holder, at least part of a peripheral surface of said first roller is projected out of said bearing holder through an opening provided in said bearing holder, and said second roller is provided in said second bearing member contacting said first roller in said bearing holder;
    a contact portion configured to determine a relative position between said first bearing member and said second bearing member by contacting said first bearing member in a state that said first bearing member is mounted in said bearing holder; and
    a moving mechanism configured to move said second bearing member toward said opening with dismounting of said first bearing member from said bearing holder, and configured to hold said second bearing member in a position in which at least a part of a peripheral surface of said second roller projects out of said bearing holder through said opening.

2. A bearing device according to claim 1, wherein said moving mechanism includes an arm connected with said second bearing member and rotatably mounted on said bearing holder, and an urging member configured to urge said arm in a direction of rotating said arm to move said second bearing member toward said opening, wherein in the state that said first bearing member is mounted in said bearing holder, said second bearing member is maintained such that said contact portion is in contact with said first bearing member by being urged by said urging member through said arm, wherein with dismounting of said first bearing member from said bearing holder, said second bearing member is moved toward said opening by being urged by said urging member through said arm, and wherein in the state that said first bearing member is dismounted from said bearing holder, said second bearing member is held in a position in which at least a part of the peripheral surface of said second roller through said opening projects out of said bearing holder by being urged by said urging member through said arm.

3. A bearing device according to claim 1, wherein said moving mechanism includes a movement engaging portion provided on said first bearing member and engaged with said second bearing member, and a holding engaging portion provided on said second bearing member and engaged with said bearing holder, wherein with dismounting of said first bearing member from said bearing holder, said second bearing member is moved toward said opening together with said first bearing member by engagement of said movement engaging portion with said second bearing member, and wherein in the state that said first bearing member is dismounted from said bearing holder, said second bearing member is held in a position in which at least a part of the peripheral surface of said second roller projects out of said bearing holder through said opening, by engagement of said holding engaging portion with said bearing holder.

4. A bearing device according to claim 3, wherein in the state that said first bearing member is mounted in said bearing holder, said second bearing member is urged by said urging member disposed on said bearing holder, so that said contact portion is maintained in a state of contacting said first bearing member.

5. A bearing device according to claim 3, wherein said first bearing member includes a releasing portion configured to disengage said movement engaging portion from said second bearing member in a state that said holding engaging portion is in engagement with said bearing holder.

6. A bearing device according to claim 5, wherein said first bearing member includes a mounting engaging portion engageable with said bearing holder to maintain said first bearing member in a state of being mounted on said bearing holder, and wherein said releasing portion disengages said movement engaging portion from said second bearing member and disengages said mounting engageable member from said bearing holder.

7. A bearing device according to claim 1, further comprising spacing means configured to space said first roller and said second roller from each other when said first bearing member starts to be mounted in said bearing holder, and configured to permit contact said first roller and said second roller to each other in a state that said first bearing member is mounted in said bearing holder.

8. A bearing device according to claim 7, wherein said spacing means includes a projection contacting said first bearing member or a member which move together with said first bearing member or, at the time when said first bearing member start to be mounted in said bearing holder and at least in a part of a subsequent period of said first bearing member moving to a position of being mounted in said bearing holder, said projection being provided on said second bearing member or a member which moves together with said second bearing member, retracted from the contact position, in the state that said first bearing member is mounted in said bearing holder, or said spacing means includes a projection contacting said second bearing member or a member which moves together with said second bearing member, at the time when said first bearing member start to be mounted in said bearing holder and at least in a part of a subsequent period of said first bearing member moving to a position of being mounted in said bearing holder, said projection being provided on said first bearing member or a member which moves together with said first bearing member, retracted from the contact position, in the state that said first bearing member is mounted in said bearing holder.

9. A bearing device according to claim 1, wherein said first roller is an elastic roller having a surface of an elastic material, and said second roller is a metal roller having a surface of metal.

10. A bearing device according to claim 1, wherein said bearing holder is provided with a feeding guide provided adjacent to said opening configured to guide a member fed by said first roller, wherein said second roller is held by said moving mechanism in a position in which at least a part of the peripheral surface of said second roller projects out beyond the surface of said feeding guide.

11. A transferring device comprising said bearing device according to claim 1, wherein said first roller is a transfer roller configured to transfer toner from an image bearing member onto a transfer material, and said second roller is an electric energy supply roller configured to supply electric current to said first roller.

12. A transferring device according to claim 11, wherein said image bearing member is an intermediary transfer member configured to convey the toner transferred from another image bearing member to further transfer the already transferred toner onto a transfer material.

13. A transferring device according to claim 12, wherein said first roller sandwiches said image bearing member using an opposed member provided opposed with said image bearing member therebetween, and said opposed member is supplied with a voltage having a polarity same as a regular charge polarity of the toner, and wherein said first roller is electrically grounded, and said second roller is supplied with a voltage having the polarity same as the regular plurality of the toner.

* * * * *